United States Patent
Lee et al.

(10) Patent No.: US 9,519,194 B2
(45) Date of Patent: Dec. 13, 2016

(54) LIQUID CRYSTAL DISPLAY

(71) Applicant: SAMSUNG DISPLAY CO., LTD., Yongin, Gyeonggi-do (KR)

(72) Inventors: Hee Hwan Lee, Seoul (KR); Hae Ryeong Park, Suwon-si (KR); Dong Il Yoo, Goyang-si (KR); Mun-Soo Park, Suwon-si (KR); Kyu Su Ahn, Seoul (KR); Yong Woo Lee, Gimpo-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 218 days.

(21) Appl. No.: 14/320,767

(22) Filed: Jul. 1, 2014

(65) Prior Publication Data

US 2015/0009442 A1 Jan. 8, 2015

(30) Foreign Application Priority Data

Jul. 2, 2013 (KR) .................. 10-2013-0077235

(51) Int. Cl.
*G02F 1/1343* (2006.01)
*G02F 1/1337* (2006.01)
*G02F 1/1362* (2006.01)

(52) U.S. Cl.
CPC ... *G02F 1/134336* (2013.01); *G02F 1/133707* (2013.01); *G02F 1/136209* (2013.01); *G02F 2001/134345* (2013.01); *G02F 2001/136222* (2013.01)

(58) Field of Classification Search
CPC .............................................. G02F 1/134336
See application file for complete search history.

(56) References Cited

U.S. PATENT DOCUMENTS

| | | | |
|---|---|---|---|
| 8,045,112 B2 | 10/2011 | Lee et al. | |
| 8,059,243 B2 | 11/2011 | Kim et al. | |
| 8,325,306 B2 | 12/2012 | Nakanishi et al. | |
| 9,164,329 B2 * | 10/2015 | Jung | G02F 1/134309 |
| 9,177,519 B2 * | 11/2015 | Tsao | G09G 3/3648 |
| 2010/0149464 A1 | 6/2010 | Han et al. | |
| 2011/0242443 A1 | 10/2011 | Choi et al. | |
| 2011/0242468 A1 * | 10/2011 | Choi | C08G 8/12 349/129 |
| 2012/0133872 A1 | 5/2012 | Kim et al. | |
| 2012/0249940 A1 | 10/2012 | Choi et al. | |

(Continued)

FOREIGN PATENT DOCUMENTS

| | | |
|---|---|---|
| JP | 2008-097049 | 4/2008 |
| JP | 2011-133910 | 7/2011 |
| KR | 1020130125638 | 11/2013 |

*Primary Examiner* — Timothy L Rude
(74) *Attorney, Agent, or Firm* — F. Chau & Associates, LLC

(57) ABSTRACT

A liquid crystal display, including: a first substrate; a gate line and a data line disposed on the first substrate; a pixel electrode disposed on the first substrate and including a stem portion and a plurality of branch electrodes that extends obliquely from the stem portion; a second substrate facing the first substrate; and a common electrode disposed on the second substrate, and the pixel electrode further includes a plurality of oblique portions disposed between the plurality of branch electrodes and the stem portion, and the plurality of oblique portions extends in a direction different from a direction in which the plurality of branch electrodes extends.

20 Claims, 13 Drawing Sheets

(56) References Cited

U.S. PATENT DOCUMENTS

2013/0010248 A1  1/2013  Kang
2013/0021570 A1  1/2013  Zhang
2013/0300991 A1  11/2013  Lim

* cited by examiner

LIQUID CRYSTAL DISPLAY

CROSS-REFERENCE TO RELATED APPLICATION

This application claims priority under 35 U.S.C. §119 to Korean Patent Application No. 10-2013-0077235 filed in the Korean Intellectual Property Office on Jul. 2, 2013, the disclosure of which is incorporated by reference herein in its entirety.

TECHNICAL FIELD

The present invention relates to a liquid crystal display.

DISCUSSION OF THE RELATED ART

A liquid crystal display, which is one of the most common types of flat panel displays, includes two panels with field generating electrodes and a liquid crystal layer interposed therebetween. The liquid crystal display is a display device which rearranges liquid crystal molecules of the liquid crystal layer by applying a voltage to the electrodes to control an amount of transmitted light.

Methods have been developed to widen a viewing angle of the liquid crystal display. In one such method for a vertical alignment liquid crystal display, a plurality of domains are implemented by forming a pixel electrode to include a stem portion and a plurality of branch electrodes that extend from the stem portion in different directions.

However, since liquid crystal molecules arranged around the stem portion are influenced by a fringe field of the stem portion and a fringe field of the branch electrode, the liquid crystal molecules may not be arranged in a predetermined direction. Accordingly, the liquid crystal molecules may be irregularly arranged around the stem portion, thereby causing transmittance of the liquid crystal display to deteriorate.

SUMMARY

An exemplary embodiment of the present invention provides a liquid crystal display, including: a first substrate; a gate line and a data line disposed on the first substrate; a pixel electrode disposed on the first substrate and including a stem portion and a plurality of branch electrodes that extends obliquely from the stem portion; a second substrate facing the first substrate; and a common electrode disposed on the second substrate, and the pixel electrode further includes a plurality of inverse oblique portions disposed between the plurality of branch electrodes and the stem portion, and the plurality of inverse oblique portions extends in a direction different from a direction in which the plurality of branch electrodes extends.

The stem portion may include a first vertical portion disposed at an edge of a pixel area, and a first horizontal portion connected with the first vertical portion and extending in a direction parallel to the gate line, the plurality of branch electrodes may include a first branch electrode that extends in an upper right or upper left direction from the first horizontal portion, and a second branch electrode that extends in a lower right or lower left direction from the first horizontal portion, and the inverse plurality of oblique portions may include a first inverse oblique portion disposed between the first horizontal portion and the first branch electrode, and a second inverse oblique portion disposed between the first horizontal portion and the second branch electrode.

The first inverse oblique portion may extend in a direction different from a direction in which the first branch electrode extends, and the second inverse oblique portion may extend in a direction different from a direction in which the second branch electrode extends.

The pixel electrode may further include a first edge portion disposed along the first branch electrode and the second branch electrode and connected with the first vertical portion and the first horizontal portion.

The plurality of inverse oblique portions may include a third inverse oblique portion disposed between the first vertical portion and the first branch electrode, and a fourth inverse oblique portion disposed between the first vertical portion and the second branch electrode.

The third inverse oblique portion may extend in a direction different from the direction in which the first branch electrode extends, and the fourth inverse oblique portion may extend in a direction different from the direction in which the second branch electrode extends.

The pixel electrode may further include a first edge portion disposed along the first branch electrode and the second branch electrode and connected with the first vertical portion and the first horizontal portion.

The stem portion may include a first vertical portion and a first horizontal portion that cross each other at the center of a pixel area to have a cross shape, the plurality of branch electrodes may include a first branch electrode that extends obliquely from the first horizontal portion, and the plurality of inverse oblique portions may include a first oblique portion disposed between the first horizontal portion and the first branch electrode.

The first oblique portion may extend in a direction different from a direction in which the first branch electrode extends.

The pixel electrode may further include a first edge portion disposed along an edge of the first branch electrode and connected with the first vertical portion and the first horizontal portion.

The stem portion may include a first vertical portion and a first horizontal portion that cross each other at the center of a pixel area to have a cross shape, the plurality of branch electrodes may include a first branch electrode that extends obliquely from the first vertical portion, and the plurality of inverse oblique portions may further include a first inverse oblique portion disposed between the first vertical portion and the first branch electrode.

The first inverse oblique portion may extend in a direction different from a direction in which the first branch electrode extends.

The pixel electrode may further include a first edge portion disposed along an edge of the first branch electrode and connected with the first vertical portion and the first horizontal portion.

The stem portion may include a first vertical portion and a first horizontal portion that cross each other at the center of a pixel area to have a cross shape and form first, second, third and fourth regions, the plurality of branch electrodes may include first, second, third and fourth branch electrodes that extend obliquely from the first vertical portion and the first horizontal portion in the first, second, third and fourth regions, respectively, and the plurality of oblique portions may include first, second, third and fourth oblique portions respectively connected to the first, second, third and fourth branch electrodes, wherein the first, second, third and fourth oblique portions are connected to the first horizontal portion or the first vertical portion.

The first, second, third and fourth inverse oblique portions may extend in a direction different from a direction in which the first, second, third and fourth branch electrodes extend, respectively.

The pixel electrode may further include a first edge portion disposed along an edge of the first, second, third and fourth branch electrodes and connected with the first vertical portion and the first horizontal portion.

An exemplary embodiment of the present invention provides a liquid crystal display, including: a pixel electrode including an edge portion and a protruding portion protruding from the edge portion, the pixel electrode further including a plurality of first branch electrodes arranged on a first side of the protruding portion and a plurality of second branch electrodes arranged on a second side of the protruding portion, wherein the first and second branch electrodes are slanted with respect to the protruding portion, the pixel electrode further including a plurality of first sub-branch electrodes disposed between the first branch electrodes and the protruding portion and a plurality of second sub-branch electrodes disposed between the second branch electrodes and the protruding portion, wherein the first sub-branch electrodes are slanted with respect to the first branch electrodes and the second sub-branch electrodes are slanted with respect to the second branch electrodes.

A direction in which the first branch electrodes are arranged may be different from a direction in which the first sub-branch electrodes are arranged.

An exemplary embodiment of the present invention provides a liquid crystal display, including: a pixel electrode including a first intersecting portion and a second intersecting portion that form a cross shape, the pixel electrode further including a plurality of first branch electrodes arranged on a first side of the first intersecting portion and a plurality of second branch electrodes arranged on a second side of the first intersecting portion, wherein the first and second branch electrodes are slanted with respect to the first intersecting portion, the pixel electrode further including a plurality of first sub-branch electrodes disposed between the first branch electrodes and the first intersecting portion and a plurality of second sub-branch electrodes disposed between the second branch electrodes and the first intersecting portion, wherein the first sub-branch electrodes are slanted with respect to the first branch electrodes and the second sub-branch electrodes are slanted with respect to the second branch electrodes.

The first intersecting portion is arranged parallel to a data line and the second intersecting portion is arranged parallel to a gate line.

DETAILED DESCRIPTION OF THE EMBODIMENTS

Figure 1:
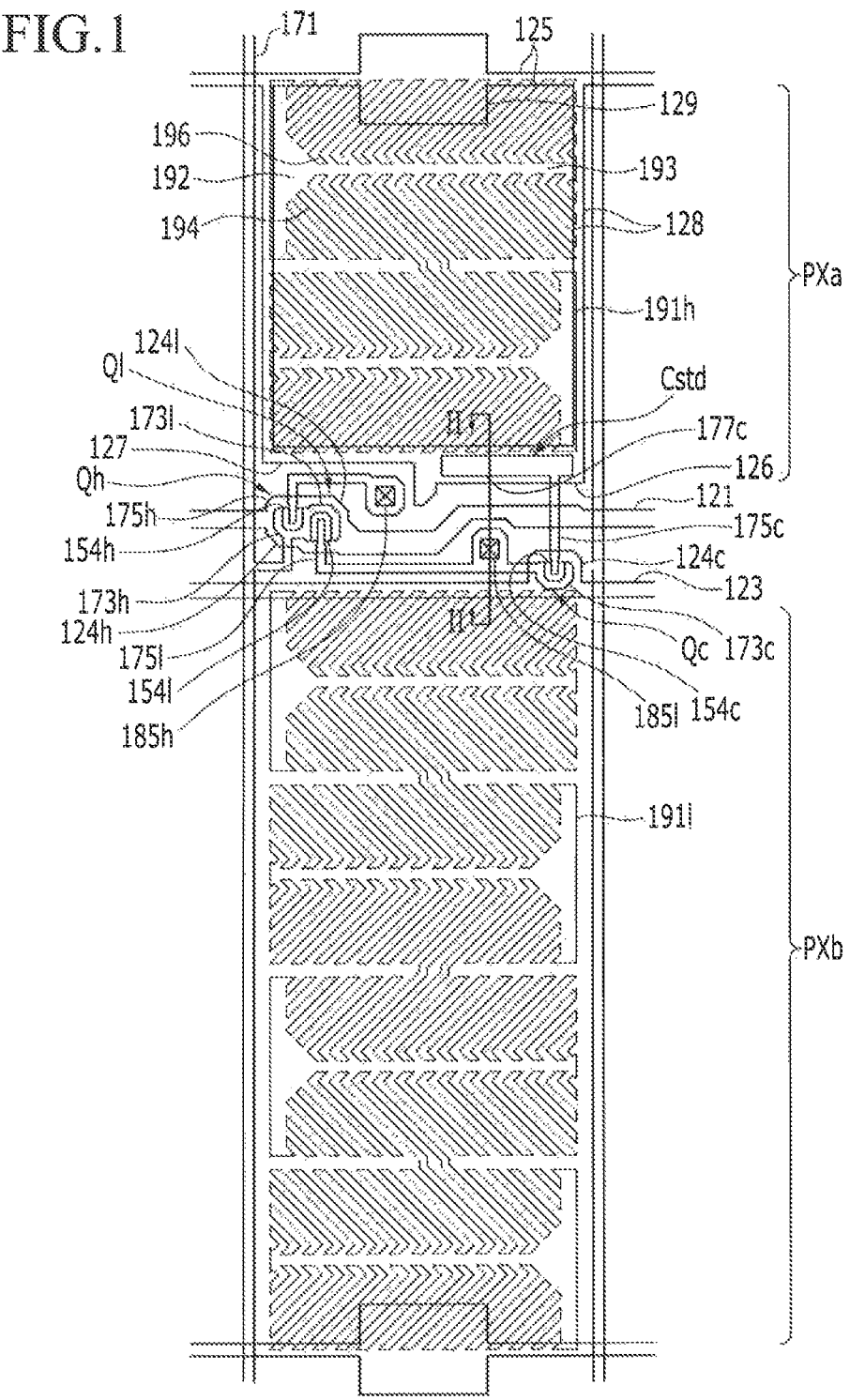
FIG. 1 is a layout view illustrating a liquid crystal display according to an exemplary embodiment of the present invention.

Exemplary embodiments of the present invention will be described more fully hereinafter with reference to the accompanying drawings. However, the described embodiments may be modified in various different ways and should not be construed as limited to the embodiments disclosed herein.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

First, a liquid crystal display according to an exemplary embodiment of the present invention will be described with reference to FIGS. 1 and 2. FIG. 1 is a layout view of a liquid crystal display according to an exemplary embodiment of the present invention, and FIG. 2 is a cross-sectional view of the liquid crystal display of FIG. 1 taken along line II-II.

Figure 2:
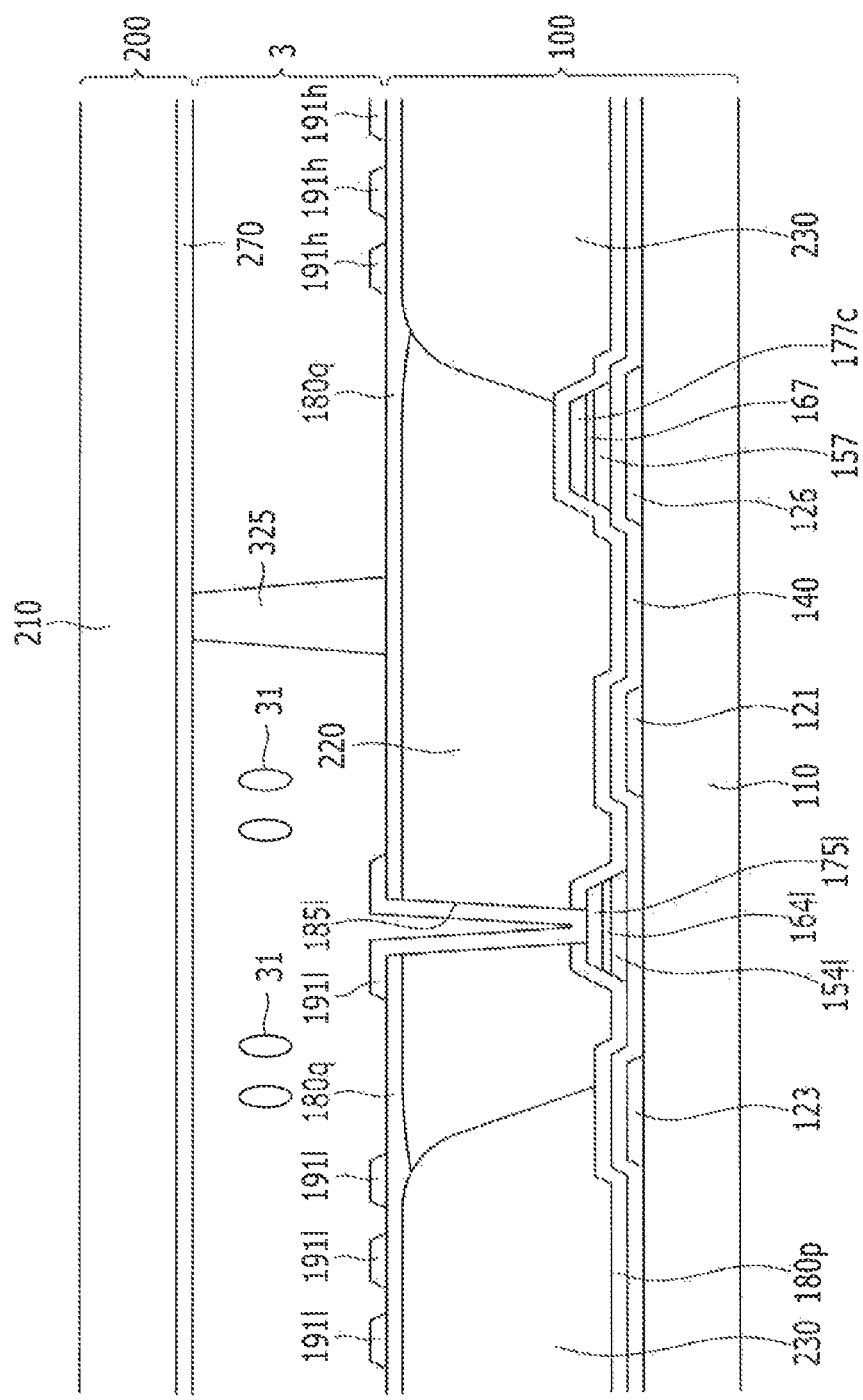
FIG. 2 is a cross-sectional view of the liquid crystal display of FIG. 1 taken along line II-II.

Referring to FIGS. 1 and 2, a liquid crystal display device according to the present exemplary embodiment includes a lower panel 100 and an upper panel 200 facing each other, a liquid crystal layer 3 interposed between the two panels 100 and 200, and a pair of polarizers (not illustrated) attached to outer sides of the panels 100 and 200.

First, the lower panel 100 will be described.

A plurality of gate conductors including a plurality of gate lines 121, a plurality of step-down gate lines 123, and a plurality of storage electrode lines 125 is formed on a first substrate 110.

The gate line 121 and the step-down gate line 123 extend in a horizontal direction to transfer gate signals. The gate line 121 includes a first gate electrode 124h and a second gate electrode 124l protruding upward and downward, and the step-down gate line 123 includes a third gate electrode 124c protruding upward. The first gate electrode 124h and the second gate electrode 124l are connected with each other to form one protrusion.

The storage electrode line 125 extends in a horizontal direction to transfer a predetermined voltage such as a common voltage. The storage electrode line 125 includes storage electrodes 129 protruding upward and downward, a pair of vertical portions 128 extending downward to be substantially vertical to the gate line 121, and a horizontal portion 127 connecting ends of the pair of vertical portions 128 with each other. The horizontal portion 127 includes a capacitor electrode 126 expanded downward.

A gate insulating layer 140 is formed on the gate conductors 121, 123, and 125.

A plurality of semiconductors made of amorphous or crystalline silicon or the like is formed on the gate insulating layer 140. The semiconductors extend in a vertical direction, and include first and second semiconductors 154h and 154l extending toward the first and second gate electrodes 124h and 124l and connected with each other, and a third semiconductor 154c connected with the second semiconductor 154l. The third semiconductor 154c is extended to form a fourth semiconductor 157.

A plurality of ohmic contacts is formed on the semiconductors 154h, 154l, 154c, and 157, a first ohmic contact (not illustrated) is formed on the first semiconductor 154h, and a second ohmic contact 164l and a third ohmic contact (not illustrated) are formed on the second semiconductor 154l and the third semiconductor 154c, respectively. The third ohmic contact extends to form a fourth ohmic contact 167.

Data conductors including a plurality of data lines 171, a plurality of first drain electrodes 175h, a plurality of second drain electrodes 175l, and a plurality of third drain electrodes 175c are formed on the ohmic contacts 164b and 167.

The data line 171 transfers a data signal and extends in a vertical direction to cross the gate line 121 and the step-down gate line 123. Each data line 171 includes a first source electrode 173h and a second source electrode 173l which extend toward the first gate electrode 124h and the second gate electrode 124l.

The first drain electrode 175h, the second drain electrode 175l, and the third drain electrode 175c include a wide end portion and a rod-shaped end portion, respectively. The rod-shaped end portions of the first drain electrode 175h and the second drain electrode 175l are partially surrounded by the first source electrode 173h and the second source electrode 173l. The wide end portion of the second drain electrode 175l is extended to form a third source electrode 173c. A wide end portion 177c of the third drain electrode 175c is overlapped with the capacitor electrode 126 to form a step-down capacitor Cstd, and the rod-shaped end portion of the third drain electrode 175c is partially surrounded by the third source electrode 173c.

The first, second, and third gate electrodes 124h, 124l, and 124c, the first, second, and third source electrodes 173h, 173l, and 173c, and the first, second, and third drain electrodes 175h, 175l, and 175c form first, second, and third thin film transistors (TFTs) Qh, Ql, and Qc together with the first, second, and third island-type semiconductors 154h, 154l, and 154c, respectively, and channels of the thin film transistors are formed in the respective semiconductors 154h, 154l, and 154c between the respective source electrodes 173h, 173l, and 173c and the respective drain electrodes 175h, 175l, and 175c.

The semiconductors 154h, 154l, 154c, and 157 have substantially the same planar shape as the data conductors 175h, 175l, 175c and 177c and the ohmic contacts 164l and 167 therebelow, except for the channels between the source electrodes 173h, 173l, and 173c and the drain electrodes 175h, 175l, and 175c. In other words, an exposed portion which is not covered by the data conductors 175h, 175l, 175c and 177c in addition to a space between the source electrodes 173h, 173l, and 173c and the drain electrodes 175h, 175l, and 175c are disposed at the semiconductors 154h, 154l, and 154c, and 157.

A lower passivation layer 180p made of an inorganic insulator such as silicon nitride or silicon oxide is formed on the data conductors 175h, 175l, 175c and 177c and the exposed semiconductor portions 154h, 154l, and 154c of the semiconductors 154h, 154l, 154c, and 157.

A color filter 230 is disposed on the lower passivation layer 180p. The color filter 230 is disposed in most regions except where the first thin film transistor Qh, the second thin film transistor Ql, and the third thin film transistor Qc are disposed. However, the color filters 230 may be extended in a vertical direction across a space between adjacent data lines 171. Each color filter 230 may display one of the primary colors such as the three primary colors of red, green and blue.

A light blocking member 220 is disposed on a region where the color filter 230 is not disposed and on a part of the color filter 230. The light blocking member 220 may be a black matrix and blocks light leakage. The light blocking member 220 extends along the gate line 121 and the step-down gate line 123 to be expanded upward and downward, and includes a part which covers a region in which the first thin film transistor Qh, the second thin film transistor Ql, and the third thin film transistor Qc are disposed and a part which extends along the data line 171. A spacer 325 is formed on the light blocking member 220. Although not illustrated, the spacer 325 may include a plurality of spacers having different heights. Further, the spacer 325 may be made of a colored photosensitive material including a black pigment and the like, and the colored photosensitive material may have positive photosensitivity and have a characteristic in which a height is varied according to where it is located. Further, the spacer 325 may be formed on the same layer as the light blocking member 220.

An upper passivation layer 180q is formed on the color filter 230 and the light blocking member 220. The upper passivation layer 180q may prevent the color filter 230 and the light blocking member 220 from being lifted, and prevent defects such as an afterimage which may be caused when a screen is driven by suppressing contamination of the liquid crystal layer 3 which may be due to an organic material such as a solvent flowing thereinto from the color filter 230.

A plurality of first contact holes 185h and a plurality of second contact holes 185l which expose the wide end portion of the first drain electrode 175h and the wide end portion of the second drain electrode 175l, respectively are formed in the lower passivation layer 180p, and the upper passivation layer 180q.

A plurality of pixel electrodes 191 is formed on the upper passivation layer 180q.

Figure 4:
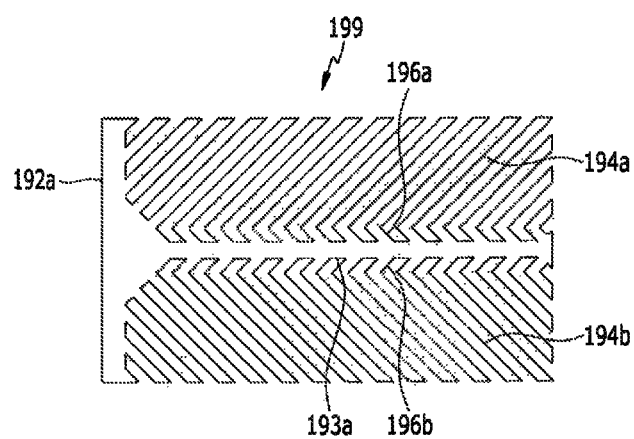
FIG. 4 is a layout view illustrating an electrode of the liquid crystal display according to an exemplary embodiment of the present invention.

Each pixel electrode 191 includes a first subpixel electrode 191h and a second subpixel electrode 191l which are separated from each other with two gate lines 121 and 123 therebetween and disposed in a pixel area above and below the gate lines 121 and 123. The first subpixel electrode 191h and the second subpixel electrode 191l may include electrodes 199 as illustrated in FIG. 4.

The first subpixel electrode 191h and the second subpixel electrode 191l include a vertical stem portion 192 and a horizontal stem portion 193, and a plurality of branch electrodes 194 that extend from the stem portions 192 and 193. A plurality of inverse oblique portions 196 are formed between the plurality of branch electrodes 194 and the horizontal stem portion 193. The inverse oblique portion 196 extends from the horizontal stem portion 193 in a direction different from a direction in which the branch electrode 194 extends and is connected with the branch electrode 194. An angle between the horizontal stem portion 193 from which the inverse oblique portion 196 extends and the inverse oblique portion 196 may be more than 90° or less than 90°.

In the illustrated exemplary embodiment, the first subpixel electrode 191h includes two vertical stem portions 192, one disposed at a left side of an upper area and one disposed at a right side of a lower area, two horizontal stem portions 193 that extend in the direction in which the gate line 121 extends, one connected with the vertical stem portion 192 in the upper area and one connected with the vertical stem portion 192 in the lower area, a plurality of branch electrodes 194 that extend from the horizontal stem portion 193 and the vertical stem portion 192 of the upper area in an upper right direction and a lower right direction, and a plurality of branch electrodes 194 that extend from the horizontal stem portion 193 and the vertical stem portion 192 of the lower area in an upper left direction, and a lower left direction. The second subpixel electrode 191l has a shape in which the first subpixel electrode 191h is disposed in an upper area and the first subpixel electrode 191h is disposed in a lower area and connected to each other. In other words, the second subpixel electrode 191l includes four vertical stem portions 192, four horizontal stem portions 193, and a plurality of branch electrodes 194 that extend from the respective vertical stem portions 192 and horizontal stem portions 193.

The inverse oblique portions 196 are formed between the horizontal stem portion 193 and the branch electrodes 194 of each of the first subpixel electrode 191h and the second subpixel electrode 191l. The inverse oblique portions 196 extend from the horizontal stem portion 193 in a direction different from a direction in which the branch electrodes 194 extend and are connected with the branch electrode 194.

The first and second subpixel electrodes 191h and 191l are overlapped with the storage electrode line 125 in addition to the storage electrode 129 to form the first and second storage capacitors Csth and Cstl (refer to FIG. 3), and the first and second storage capacitors Csth and Cstl reinforce voltage storage capacities of first and second liquid crystal capacitors Clch and Clcl (refer to FIG. 3), respectively.

The capacitor electrode 126 and the expansion 177c of the third drain electrode 175c are overlapped with each other with the gate insulating layer 140 and the semiconductor layers 157 and 167 therebetween to form the step-down capacitor Cstd. In an exemplary embodiment of the present invention, the semiconductor layers 157 and 167 which are disposed between the capacitor electrode 126 and the expansion 177c of the third drain electrode 175c which form the step-down capacitor Cstd may be removed.

A lower alignment layer (not illustrated) is formed on the pixel electrode 191 and the exposed upper passivation layer 180q.

Next, the upper panel 200 will be described.

A common electrode 270 is formed on a second insulation substrate 210. An upper alignment layer (not illustrated) is formed on the common electrode 270.

Polarizers (not illustrated) are provided on outer sides of the two panels 100 and 200, and transmissive axes of the two polarizers are perpendicular to each other, and one transmissive axis thereof may be parallel to the gate line 121.

The liquid crystal layer 3 has negative dielectric anisotropy, and liquid crystal molecules of the liquid crystal layer 3 are aligned so that long axes thereof are vertical to the surfaces of the two panels 100 and 200 in a state where an electric field is not applied. Accordingly, incident light does not pass through an orthogonal polarizer but is blocked while the electric field is not applied.

At least one of the lower alignment layer, the upper alignment layer, and the liquid crystal layer 3 includes a photopolymerizable material.

As described above, the first subpixel electrode 191h and the second subpixel electrode 191l to which the data voltages are applied generate an electric field together with the common electrode 270 of the common electrode panel 200, and as a result, the liquid crystal molecules of the liquid crystal layer 3 which are aligned to be vertical to the surfaces of the first substrate 110 and the second substrate 210 while the electric field is not applied are inclined in a horizontal direction to the surfaces of the first substrate 110 and the second substrate 210 and luminance of light passing through the liquid crystal layer 3 varies depending on an inclined degree of the liquid crystal molecules.

Magnitudes of the voltages applied to the first subpixel electrode 191h and the second subpixel electrode 191l vary according to the step-down capacitor Cstd, and the voltage of the first subpixel electrode 191h having a relatively small area may be higher than the voltage of the second subpixel electrode 191l having a relatively large area.

As such, when the voltages of the first subpixel electrode 191h and the second subpixel electrode 191l are different from each other, voltages applied to the liquid crystal capacitors Clch and Clcl formed in the two pixel electrodes 191a and 191b are different from each other and thus tilt angles of the liquid crystal molecules of each subpixel PXa or PXb are different from each other. Accordingly, when the voltages applied to the first subpixel electrode 191h and the second subpixel electrode 191l are appropriately adjusted, an image viewed from the side may be maximally close to an image viewed from the front, and as a result, side visibility may be improved.

Figure 3:
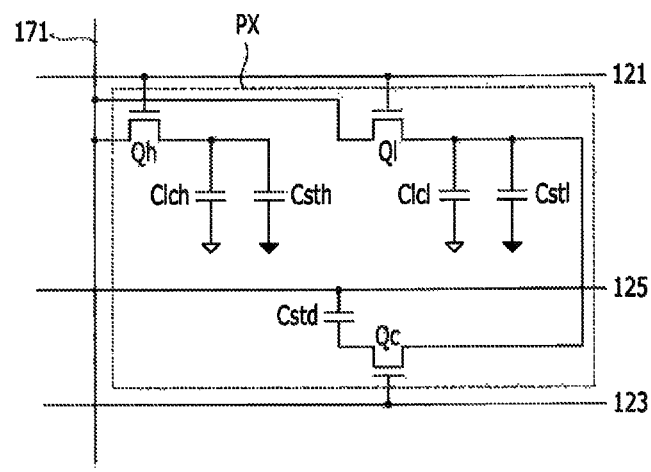
FIG. 3 is an equivalent circuit diagram of a pixel of a liquid crystal display device according to an exemplary embodiment of the present invention.

Then, referring to FIG. 3, a layout of a signal line of a liquid crystal display according to an exemplary embodiment of the present invention will be described in more detail. FIG. 3 is an equivalent circuit diagram of a pixel of a liquid crystal display device according to an exemplary embodiment of the present invention.

Referring to FIG. 3, the liquid crystal display according to the present exemplary embodiment may include signal lines including a gate line 121, a storage electrode line 125, a step-down gate line 123, and a data line 171, and a pixel PX connected to the signal lines.

The pixel PX includes first, second and the third switching elements Qh, Ql, and Qc, first and second liquid crystal capacitors Clch and Clcl, first and second storage capacitors Csth and Cstl, and a step-down capacitor Cstd. Herein, the first switching element Qh and a first thin film transistor Qh, the second switching element Ql and a second thin film transistor Ql, and the third switching element Qc and a third thin film transistor Qc are represented by the same reference numerals, respectively.

The first and second switching elements Qh and Ql are connected to the gate line 121 and the data line 171, respectively, and the third switching element Qc is connected to the step-down gate line 123.

The first and second switching elements Qh and Ql are three-terminal elements such as a thin film transistor formed on the lower panel 100, and control terminals thereof are connected to the gate line 121, input terminals are connected to the data line 171, and output terminals are connected to the first and second liquid crystal capacitors Clch and Clcl and the first and second storage capacitors Csth and Cstl, respectively.

The third switching element Qc is a three-terminal element such as a thin film transistor formed on the lower panel 100, and a control terminal thereof is connected to the step-down gate line 123, an input terminal is connected to the second liquid crystal capacitor Clcl, and an output terminal is connected to the step-down capacitor Cstd.

The first and second liquid crystal capacitors Clch and Clcl are formed by overlapping the first and second subpixel electrodes 191h and 191l connected with the first and second switching elements Qh and Ql with the common electrode 270. The first and second storage capacitors Csth and Cstl are formed by overlapping the storage electrode line 125 including the storage electrode 129 with the first and second subpixel electrodes 191h and 191l.

The step-down capacitor Cstd is connected to the output terminal of the third switching element Qc and the storage electrode line 125, and formed by overlapping the storage electrode line 125 provided in the lower panel 100 with the output terminal of the third switching element Qc with an insulator therebetween.

The pixel PX of the liquid crystal display according to the present exemplary embodiment is described to include the step-down capacitor Cstd and two subpixel electrodes 191h and 191l, but the pixel structure for use with an exemplary embodiment of the present invention is not limited thereto.

The liquid crystal display according to an exemplary embodiment of the present invention includes the liquid crystal layer 3 interposed between the two panels 100 and 200, and the liquid crystal layer 3 is initially aligned to have a pretilt.

Hereafter, an electrode of a liquid crystal display according to an exemplary embodiment of the present invention will be described in detail with reference to FIG. 4. FIG. 4 is a layout view illustrating an electrode of a liquid crystal display according to an exemplary embodiment of the present invention.

Referring to FIG. 4, an electrode 199 of the pixel electrode of the liquid crystal display according to the present exemplary embodiment includes a first vertical portion 192a and a first horizontal portion 193a. The first vertical portion 192a may extend in a direction parallel to a direction in which the data line 171 extends and the first horizontal portion 193a may extend in a direction parallel to a direction in which the gate line 121 extends. The first vertical portion 192a and the first horizontal portion 193a meet at the center of the first vertical portion 192a.

A plurality of first branch electrodes 194a and a plurality of second branch electrodes 194b extend from the first vertical portion 192a and the first horizontal portion 193a. The plurality of first branch electrodes 194a extends in an upper right direction from the first vertical portion 192a and the first horizontal portion 193a and the plurality of second branch electrodes 194b extends in a lower right direction from the first vertical portion 192a and the first horizontal portion 193a.

A plurality of first inverse oblique portions 196a is formed between the first horizontal portion 193a and the plurality of first branch electrodes 194a. The plurality of first inverse oblique portions 196a is connected with the plurality of first branch electrodes 194a and the plurality of first inverse oblique portions 196a extends in an upper left direction different from the upper right direction in which the plurality of first branch electrodes 194a extends from the first horizontal portion 193a.

Similarly, a plurality of second inverse oblique portions 196b is formed between the first horizontal portion 193a and the plurality of second branch electrodes 194b. The plurality of second inverse oblique portions 196b is connected with the plurality of second branch electrodes 194b and the plurality of second inverse oblique portions 196b extends in a lower left direction different from the lower right direction in which the plurality of second branch electrodes 194b extends from the first horizontal portion 193a.

An angle between the first inverse oblique portion 196a and the first horizontal stem portion 193a may be more than 90° or less than 90°. In other words, an angle between the first inverse oblique portion 196a and the first horizontal stem portion 193a is an acute angle or an obtuse angle.

Although not illustrated in FIG. 4 but shown in FIG. 1, the electrode 199 may further include a second vertical portion disposed in an opposite direction to the first vertical portion 192a and a second horizontal portion that is connected with the second vertical portion at the center of the second vertical portion and extends in parallel to the first horizontal portion 193a. The electrode 199 may further include a plurality of third branch electrodes and a plurality of fourth branch electrodes that extend from the second vertical portion and the second horizontal portion, and in an upper left or lower left direction. In addition, the electrode 199 may further include a plurality of third inverse oblique portions and a plurality of fourth inverse oblique portions that are formed between the second horizontal portion, and the plurality of third branch electrodes and the plurality of fourth branch electrodes.

When a plurality of branch electrodes is formed like this, liquid crystal molecules are tilted in a direction parallel to the length direction of the plurality of branch electrodes by an influence of a fringe field which occurs at edges of the plurality of branch electrodes. Branch electrodes that extend in four different directions are formed in one pixel, and as a result, one pixel area includes four subareas in which the length directions of the branch electrodes are different from each other. Therefore, liquid crystal molecules in one pixel area are aligned in approximately four directions and four domains in which the alignment directions of the liquid crystal molecules are different from each other are formed in the liquid crystal layer 3. As such, a reference viewing angle of the liquid crystal display may be increased by varying the tilt directions of the liquid crystal molecules.

In the electrode 199 of the liquid crystal display according to the present exemplary embodiment, the inverse oblique portion 196a/b formed between the stem portion 193a and the branch electrode 194a/b can prevent an irregular behavior of the liquid crystal molecules, which may occur on a boundary portion between the stem portion 193a and the branch 30) electrode 194a/b.

Figure 5:
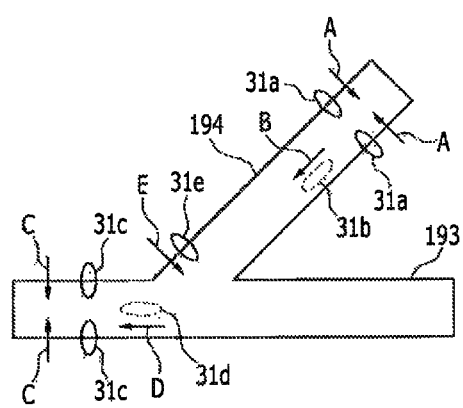
FIG. 5 is a diagram illustrating a part of an electrode of an existing liquid crystal display.
Figure 6:
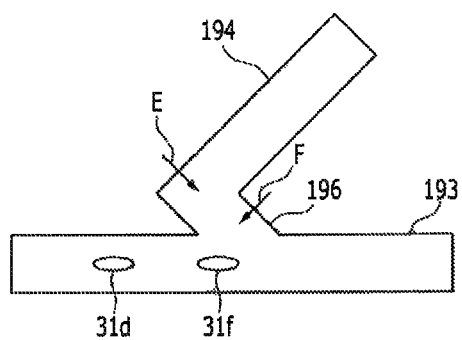
FIGS. 6 and 7 are diagrams illustrating a part of an electrode of a liquid crystal display according to an exemplary embodiment of the present invention.
Figure 7:
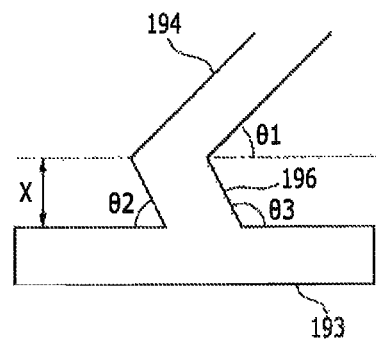

In this regard, referring to FIGS. 5 to 7, the electrode will be described in more detail. FIG. 5 is a diagram illustrating a part of an electrode of an existing liquid crystal display. FIGS. 6 and 7 are diagrams illustrating a part of an electrode of a liquid crystal display according to an exemplary embodiment of the present invention.

First, referring to FIG. 5, the electrode of the existing liquid crystal display includes a horizontal stem portion 193 and a branch electrode 194 that extends from the horizontal stem portion 193 obliquely at a predetermined angle. In this case, a first fringe field A is created in a direction vertical to an edge of the branch electrode 194, and as a result, first liquid crystal molecules 31a that are disposed around the branch electrode 194 are tilted in parallel to the direction of the first fringe field A and thereafter, collide with each other to be tilted in parallel to a length direction in which the branch electrode 194 extends. Therefore, second liquid crystal molecules 31b that are disposed above the branch electrode 194 are tilted in a first direction B which is parallel to the length direction in which the branch electrode 194 extends. Further, a second fringe field C is created in a direction vertical to the edge of the stem portion 193, and as a result, third liquid crystal molecules 31c that are disposed around the stem portion 193 are tilted in parallel to the direction of the second fringe field C and thereafter, collide with each other to be tilted in parallel to the length direction in which the stem portion 193 extends. Therefore, fourth liquid crystal molecules 31d that are disposed above the stem portion 193 are tilted in a second direction D which is parallel to the length direction in which the stem portion 193 extends.

However, fifth liquid crystal molecules 31e that are disposed at a portion adjacent to a start portion of the branch electrode 194 which has an obtuse angle with the stem portion 193 where the stem portion 193 and the branch electrode 194 meet are tilted in parallel to the direction of a third fringe field E by the influence of the third fringe field E created in a direction vertical to the edge of the start portion of the branch electrode 194. Based on a left direction and a right direction, the fifth liquid crystal molecules 31e that are tilted by the influence of the third fringe field E are in the first direction B parallel to the length direction in which the branch electrode 194 extends and a direction opposite to the second direction D parallel to the length direction in which the stem portion 193 extends. Accordingly, when the stem portion 193 and the branch electrode 194 form the obtuse angle, liquid crystal molecules at a portion adjacent to the stem portion 193 where the stem portion 193 and the branch electrode 194 meet are irregularly tilted by the influence of the fifth liquid crystal molecules 31e disposed where the stem portion 193 and the branch electrode 194 meet.

However, referring to FIG. 6, an electrode of a liquid crystal display according to an exemplary embodiment of the present invention includes a horizontal stem portion 193, a branch electrode 194 that extends from the horizontal stem portion 193 obliquely at a predetermined angle, and an inverse oblique portion 196 that is formed between the branch electrode 194 and the horizontal stem portion 193, and extends in a direction opposite to the branch electrode 194 based on a left direction and a right direction. The inverse oblique portion 196 extends in the direction opposite to the branch electrode 194 based on the left direction and the right direction, in other words, a direction in which the horizontal stem portion 193 extends.

As described above with reference to FIG. 5, the first fringe field A is created in the direction vertical to the edge of the branch electrode 194, and as a result, the first liquid molecules 31a that are disposed around the branch electrode 194 are tilted in parallel to the direction of the first fringe field A and thereafter, collide with each other to be tilted in parallel to the length direction in which the branch electrode 194 extends. Therefore, the second liquid crystal molecules 31b that are disposed above the branch electrode 194 are tilted in the first direction B which is parallel to the length direction in which the branch electrode 194 extends. Further, the second fringe field C is created in the direction vertical to the edge of the stem portion 193, and as a result, the third liquid crystal molecules 31c that are disposed around the stem portion 193 are tilted in parallel to the direction of the second fringe field C and thereafter, collide with each other to be tilted in parallel to the length direction in which the stem portion 193 extends. Therefore, the fourth liquid crystal molecules 31d that are disposed above the stem portion 193 are tilted in the second direction D which is parallel to the length direction in which the stem portion 193 extends.

In this case, the influence of the third fringe field E which occurs in the direction vertical to the edge of the branch electrode 194 is reduced by the influence of a fourth fringe field F which occurs in the direction vertical to the edge of the inverse oblique portion 196 which has the obtuse angle with the horizontal stem portion 193. Therefore, sixth liquid crystal molecules 31f that are disposed at a portion adjacent to the stem portion 193 may be tilted in parallel to the second direction D which is parallel to the length direction in which the stem portion 193 extends. Therefore, transmittance of the liquid crystal display can be prevented from deteriorating due to an irregular behavior of liquid crystal molecules which may occur around the stem portion 193.

Referring to FIG. 7, a minimum value of a vertical interval X of an area where the inverse oblique portion 196 from the horizontal stem portion 193 is formed is approximately 4 μm, and has a value between a first value acquired by adding the width of a plurality of the branch electrodes 194 and an interval between two adjacent electrodes among the plurality of branch electrodes 194, and double the first value.

When the vertical interval X of the area where the inverse oblique portion 196 is formed is too narrow, the influence of the fourth fringe field F is too small, and as a result, the influence of the third fringe field E may not be reduced and when the vertical interval X of the area where the inverse oblique portion 196 is formed is too wide, the influence of the inverse oblique portion 196 increases, and as a result, the liquid crystal molecules that are tilted in a direction which is not parallel to the length direction of the branch electrode 194 increase. Therefore, the transmittance of the liquid crystal display may further deteriorate.

Further, a first angle $\theta 1$ which is an acute angle between the horizontal stem portion 193 and the branch electrode 194 may be equal to or more than a second angle $\theta 2$ which is an acute angle between the horizontal stem portion 193 and the inverse oblique portion 196. As described above, the direction in which the branch electrode 194 extends and the direction in which the inverse oblique portion 196 extends may be opposite to each other, based on the left direction and the right direction, in other words, the direction in which the horizontal stem portion 193 extends.

The inverse oblique portion 196 has an angle which is more than or less than 90° with the horizontal stem portion 193. In other words, one edge of the inverse oblique portion 196 has the second angle $\theta 2$ which is the acute angle with the horizontal stem portion 193 and the opposite edge has a third angle $\theta 3$ which is an obtuse angle with the horizontal stem portion 193.

As such, in the liquid crystal display according to the present exemplary embodiment, the inverse oblique portion 196 that extends in the direction opposite to the branch electrode 194 is formed between the stem portion 193 and the branch electrode 194 to prevent the transmittance of the liquid crystal display from deteriorating due to the irregular behavior of the liquid crystal molecules which may occur around the stem portion 193.

Figure 8:
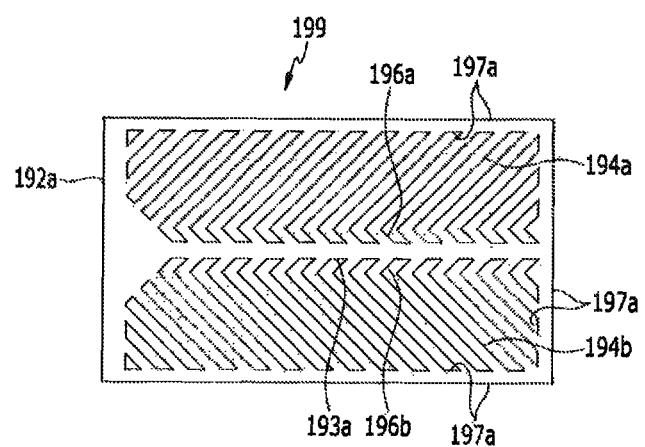
FIG. 8 is a layout view illustrating an electrode of a liquid crystal display according to an exemplary embodiment of the present invention.

An electrode of a liquid crystal display according to an exemplary embodiment of the present invention will be described with reference to FIG. 8. FIG. 8 is a layout view illustrating an electrode of a liquid crystal display according to an exemplary embodiment of the present invention.

Referring to FIG. 8, the electrode of the liquid crystal display according to the present exemplary embodiment is similar to the electrode of the liquid crystal display illustrated in FIG. 4.

An electrode 199 of the pixel electrode of the liquid crystal display according to the present exemplary embodiment includes a first vertical portion 192a and a first horizontal portion 193a. The first vertical portion 192a may extend in a direction parallel to a direction in which the data line 171 extends and the first horizontal portion 193a may extend in a direction parallel to a direction in which the gate line 121 extends. The first vertical portion 192a and the first horizontal portion 193a meet at the center of the first vertical portion 192a.

A plurality of first branch electrodes 194a and a plurality of second branch electrodes 194b extend from the first vertical portion 192a and the first horizontal portion 193a. The plurality of first branch electrodes 194a extends in an upper right direction from the first vertical portion 192a and the first horizontal portion 193a and the plurality of second branch electrodes 194b extends in a lower right direction from the first vertical portion 192a and the first horizontal portion 193a.

A plurality of first inverse oblique portions 196a is formed between the first horizontal portion 193a and the plurality of first branch electrodes 194a. The plurality of first inverse oblique portions 196a is connected with the plurality of first branch electrodes 194a and extends in an upper left direction different from the upper right direction in which the plurality of first branch electrodes 194a extends from the first horizontal portion 193a.

Similarly, a plurality of second inverse oblique portions 196b is formed between the first horizontal portion 193a and the plurality of second branch electrodes 194b. The plurality of second inverse oblique portions 196b is connected with the plurality of second branch electrodes 194b and extends in a lower left direction different from the lower right direction in which the plurality of second branch electrodes 194b extends from the first horizontal portion 193a.

An angle between the first inverse oblique portion 196a and the first horizontal stem portion 193a may be more than 90° or less than 90°. In other words, an angle between the first inverse oblique portion 196a and the first horizontal stem portion 193a is an acute angle or an obtuse angle.

Although not illustrated in FIG. 8, but gleanable from FIG. 1, the electrode 199 may further include a second vertical portion disposed in an opposite direction to the first vertical portion 192a and a second horizontal portion that is connected with the second vertical portion at the center of the second vertical portion and extends in parallel to the first horizontal portion 193a. The electrode 199 may further include a plurality of third branch electrodes and a plurality of fourth branch electrodes that extend from the second vertical portion and the second horizontal portion, and in an upper left or lower left direction. In addition, the electrode 199 may further include a plurality of third inverse oblique portions and a plurality of fourth inverse oblique portions that are formed between the second horizontal portion, and the plurality of third branch electrodes and the plurality of fourth branch electrodes.

The electrode 199 of the liquid crystal display according to the present exemplary embodiment further includes a first edge portion 197a that surrounds the first branch electrode 194a and the second branch electrode 194b, and is connected with the first horizontal portion 193a and the first vertical portion 192a, unlike the electrode 199 illustrated in FIG. 4.

Figure 9:
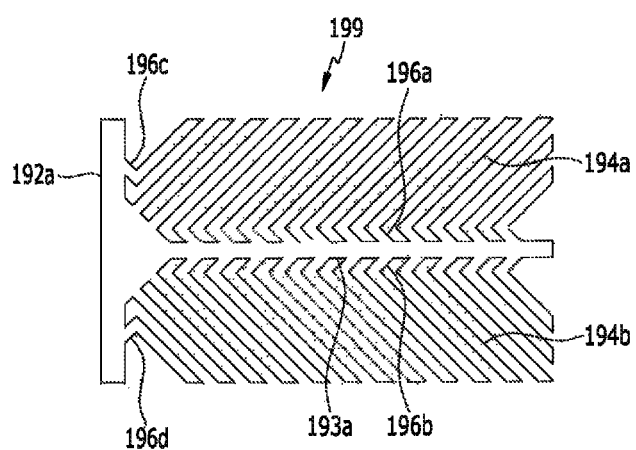
FIG. 9 is a layout view illustrating an electrode of a liquid crystal display according to an exemplary embodiment of the present invention.

A liquid crystal display according to an exemplary embodiment of the present invention will be described with reference to FIG. 9. FIG. 9 is a layout view illustrating an electrode of a liquid crystal display according to an exemplary embodiment of the present invention.

Referring to FIG. 9, the electrode of the liquid crystal display according to the present exemplary embodiment is similar to that of the liquid crystal display illustrated in FIG. 4.

An electrode 199 of the pixel electrode of the liquid crystal display according to the present exemplary embodiment includes a first vertical portion 192a and a first horizontal portion 193a. The first vertical portion 192a may extend in a direction parallel to a direction in which the data line 171 extends and the first horizontal portion 193a may extend in a direction parallel to a direction in which the gate line 121 extends. The first vertical portion 192a and the first horizontal portion 193a meet at the center of the first vertical portion 192a.

A plurality of first branch electrodes 194a and a plurality of second branch electrodes 194b extend from the first vertical portion 192a and the first horizontal portion 193a. The plurality of first branch electrodes 194a extends in an upper right direction from the first vertical portion 192a and the first horizontal portion 193a and the plurality of second branch electrodes 194b extends in a lower right direction from the first vertical portion 192a and the first horizontal portion 193a.

A plurality of first inverse oblique portions 196a is formed between the first horizontal portion 193a and the plurality of first branch electrodes 194a. The plurality of first inverse oblique portions 196a is connected with the plurality of first branch electrodes 194a and extends in an upper left direction different from the upper right direction in which the plurality of first branch electrodes 194a extends from the first horizontal portion 193a.

Similarly, a plurality of second inverse oblique portions 196b is formed between the first horizontal portion 193a and the plurality of second branch electrodes 194b. The plurality of second inverse oblique portions 196b is connected with the plurality of second branch electrodes 194b and extends in a lower left direction different from the lower right direction in which the plurality of second branch electrodes 194b extends from the first horizontal portion 193a.

An angle between the first inverse oblique portion 196a and the first horizontal stem portion 193a may be more than 90° or less than 90°. In other words, an angle between the first inverse oblique portion 196a and the first horizontal stem portion 193a is an acute angle or an obtuse angle.

Although not illustrated in FIG. 9 but gleanable from FIG. 1, the electrode 199 may further include a second vertical portion disposed in an opposite direction to the first vertical portion 192a and a second horizontal portion that is connected with the second vertical portion at the center of the second vertical portion and extends in parallel to the first horizontal portion 193a. The electrode 199 may further include a plurality of third branch electrodes and a plurality of fourth branch electrodes that extend from the second vertical portion and the second horizontal portion, and in an upper left or lower left direction. In addition, the electrode 199 may further include a plurality of third inverse oblique portions and a plurality of fourth inverse oblique portions that is formed between the second horizontal portion, and the plurality of third branch electrodes and the plurality of fourth branch electrodes.

The electrode 199 of the liquid crystal display according to the present exemplary embodiment further includes a plurality of fifth inverse oblique portions 196c and a plurality of sixth inverse oblique portions 196d that are formed between the first vertical portion 192a, and the plurality of first branch electrodes 194a and the plurality of second branch electrodes 194b, unlike the electrode 199 illustrated in FIG. 4. The plurality of fifth inverse oblique portions 196c and the plurality of sixth inverse oblique portions 196d extend in a direction opposite to a direction in which the plurality of first branch electrodes 194a and the plurality of second branch electrodes 194b extend, based on a vertical direction, in other words, the direction in which the first vertical portion 192a extends.

Figure 10:
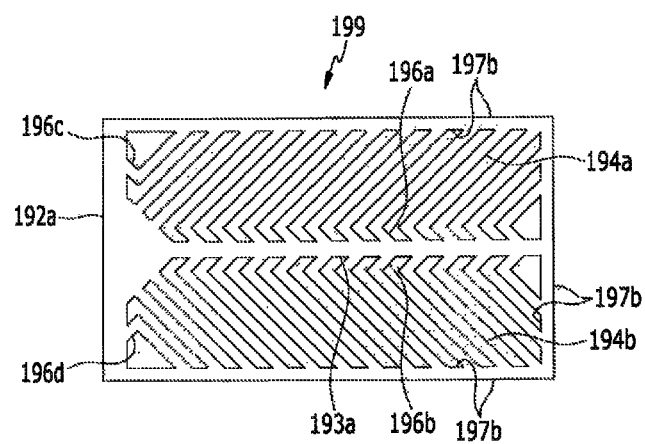
FIG. 10 is a layout view illustrating an electrode of a liquid crystal display according to an exemplary embodiment of the present invention.

An electrode of a liquid crystal display according to an exemplary embodiment of the present invention will be described with reference to FIG. 10. FIG. 10 is a layout view illustrating an electrode of a liquid crystal display according to an exemplary embodiment of the present invention.

Referring to FIG. 10, the electrode of the liquid crystal display according to the present exemplary embodiment is similar to that of the liquid crystal display illustrated in FIG. 4.

An electrode 199 of the pixel electrode of the liquid crystal display according to the current exemplary embodiment includes a first vertical portion 192a and a first horizontal portion 193a. The first vertical portion 192a may extend in a direction parallel to a direction in which the data line 171 extends and the first horizontal portion 193a may extend in a direction parallel to a direction in which the gate line 121 extends. The first vertical portion 192a and the first horizontal portion 193a meet at the center of the first vertical portion 192a.

A plurality of first branch electrodes 194a and a plurality of second branch electrodes 194b extend from the first vertical portion 192a and the first horizontal portion 193a. The plurality of first branch electrodes 194a extends in an upper right direction from the first vertical portion 192a and the first horizontal portion 193a and the plurality of second branch electrodes 194b extends in a lower right direction from the first vertical portion 192a and the first horizontal portion 193a.

A plurality of first inverse oblique portions 196a is formed between the first horizontal portion 193a and the plurality of first branch electrodes 194a. The plurality of first inverse oblique portions 196a is connected with the plurality of first branch electrodes 194a and extends in an upper left direction different from the upper right direction in which the plurality of first branch electrode 194a extends from the first horizontal portion 193a.

Similarly, a plurality of second inverse oblique portions 196b is formed between the first horizontal portion 193a and the plurality of second branch electrodes 194b. The plurality of second inverse oblique portions 196b is connected with the plurality of second branch electrodes 194b and extends in a lower left direction different from the lower right direction in which the plurality of second branch electrode 194b extends from the first horizontal portion 193a.

An angle between the first inverse oblique portion 196a and the first horizontal stem portion 193a may be more than 90° or less than 90°. In other words, an angle between the first inverse oblique portion 196a and the first horizontal stem portion 193a is an acute angle or an obtuse angle.

Although not illustrated in FIG. 10 but gleanable from FIG. 1, the electrode 199 may further include a second vertical portion disposed in an opposite direction to the first vertical portion 192a and a second horizontal portion that is connected with the second vertical portion at the center of the second vertical portion and extends in parallel to the first horizontal portion 193a. The electrode 199 may further include a plurality of third branch electrodes and a plurality of fourth branch electrodes that extend from the second vertical portion and the second horizontal portion, and in an upper left or lower left direction. In addition, the electrode 199 may further include a plurality of third inverse oblique portions and a plurality of fourth inverse oblique portions that are formed between the second horizontal portion, and the plurality of third branch electrodes and the plurality of fourth branch electrodes.

The electrode 199 of the liquid crystal display according to the current exemplary embodiment further includes a plurality of fifth inverse oblique portions 196c and a plurality of sixth inverse oblique portions 196d that are formed between the first vertical portion 192a, and the plurality of first branch electrodes 194a and the plurality of second branch electrodes 194b, unlike the electrode 199 illustrated in FIG. 4. The plurality of fifth inverse oblique portions 196c and the plurality of sixth inverse oblique portions 196d extend in a direction opposite to a direction in which the plurality of first branch electrodes 194a and the plurality of second branch electrodes 194b extend, based on the vertical direction, in other words, the direction in which the first vertical portion 192a extends.

Further, the electrode 199 of the liquid crystal display according to the present exemplary embodiment further includes a second edge portion 197b that surrounds the first branch electrode 194a and the second branch electrode 194b, and is connected with the first horizontal portion 193a and the first vertical portion 192a, unlike the electrode 199 illustrated in FIG. 4.

Figure 11:
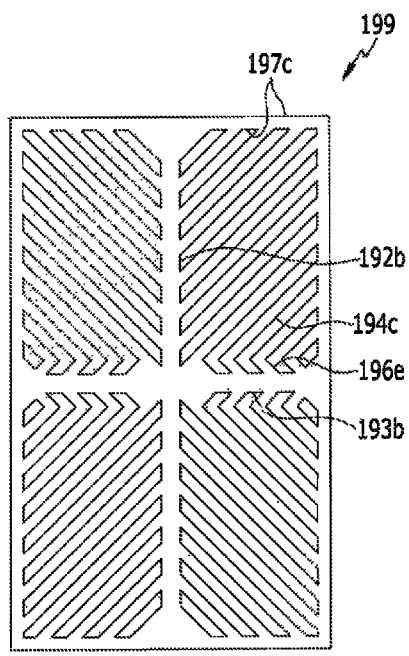
FIG. 11 is a layout view illustrating an electrode of a liquid crystal display according to an exemplary embodiment of the present invention.

An electrode of a liquid crystal display according to an exemplary embodiment of the present invention will be described with reference to FIG. 11. FIG. 11 is a layout view illustrating an electrode of a liquid crystal display according to an exemplary embodiment of the present invention.

Referring to FIG. 11, the electrode of the liquid crystal display according to the present exemplary embodiment is similar to that of the liquid crystal display illustrated in FIG. 4.

An electrode 199 of the pixel electrode of the liquid crystal display according to the present exemplary embodiment includes a third vertical portion 192b and a third horizontal portion 193b that are connected to each other and cross at the center thereof to form a cross-shaped stem portion, and a plurality of fifth branch electrodes 194c that extends obliquely from the third vertical portion 192b and the third horizontal portion 193b. The plurality of fifth branch electrodes 194c extend in four different directions based on the third vertical portion 192b and the third horizontal portion 193b that form the cross-shaped stem portion.

A seventh inverse oblique portion 196e is formed between the third horizontal portion 193b and the fifth branch electrode 194c. The seventh inverse oblique portion 196e extends in a direction opposite to a direction in which the fifth branch electrode 194c extends, based on the left direction and the right direction, in other words, the direction in which the third horizontal portion 193b extends.

Further, the electrode 199 of the pixel electrode of the liquid crystal display according to the present exemplary embodiment includes a third edge portion 197c surrounding the plurality of fifth branch electrodes 194c that extends obliquely from the third vertical portion 192b and the third horizontal portion 193b. However, the third edge portion 197c may be omitted.

Figure 12:
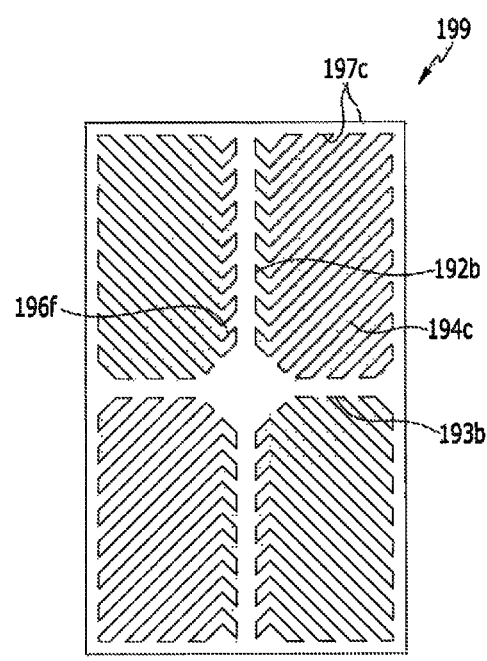
FIG. 12 is a layout view illustrating an electrode of a liquid crystal display according to an exemplary embodiment of the present invention.

An electrode of a liquid crystal display according to an exemplary embodiment of the present invention will be described with reference to FIG. 12. FIG. 12 is a layout view illustrating an electrode of a liquid crystal display according to an exemplary embodiment of the present invention.

Referring to FIG. 12, the electrode of the liquid crystal display according to the present exemplary embodiment is similar to that illustrated in FIG. 11.

An electrode 199 of the pixel electrode of the liquid crystal display according to the present exemplary embodiment includes a third vertical portion 192b and a third horizontal portion 193b that are connected to each other and cross at the center thereof to form a cross-shaped stem portion, and a plurality of fifth branch electrodes 194c that extends obliquely from the third vertical portion 192b and the third horizontal portion 193b. The plurality of fifth branch electrodes 194c extend in four different directions based on the third vertical portion 192b and the third horizontal portion 193b that form the cross-shaped stem portion.

An eighth inverse oblique portion 196f is formed between the third vertical portion 192b and the fifth branch electrode 194c. The eighth inverse oblique portion 196f extends in a direction opposite to a direction in which the fifth branch electrode 194c extends, based on the vertical direction, in other words, the direction in which the fifth branch electrode 194c extends.

Further, the electrode 199 of the pixel electrode of the liquid crystal display according to the present exemplary embodiment includes a third edge portion 197c surrounding the plurality of fifth branch electrodes 194c that extends obliquely from the third vertical portion 192b and the third horizontal portion 193b. However, the third edge portion 197c may be omitted.

Figure 13:
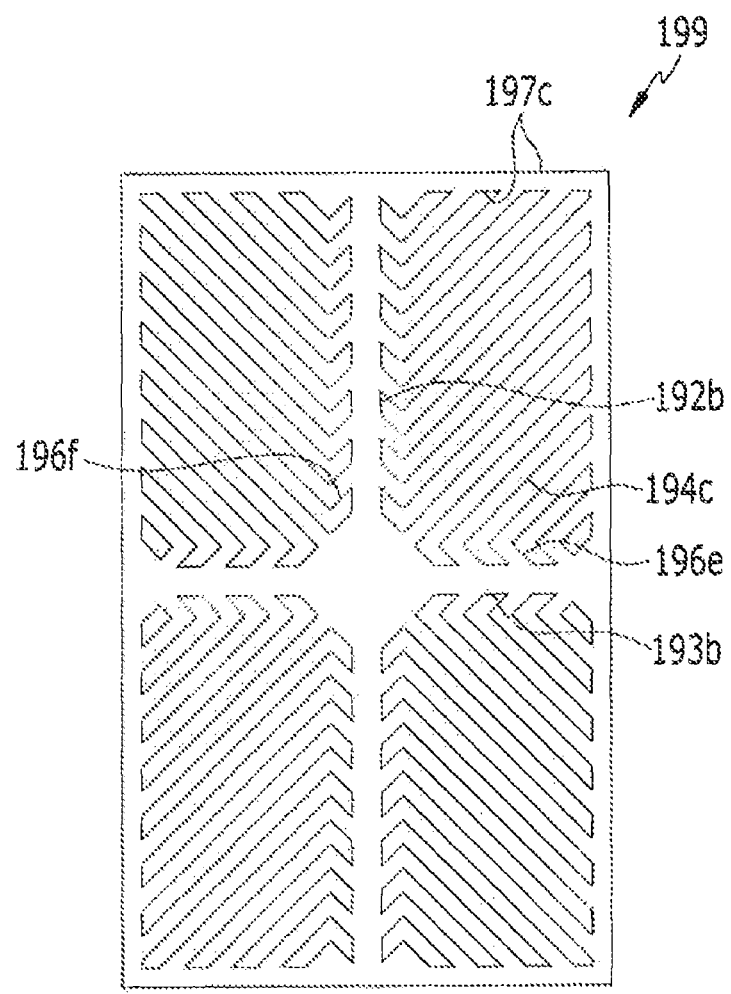
FIG. 13 is a layout view illustrating an electrode of a liquid crystal display according to an exemplary embodiment of the present invention.

An electrode of a liquid crystal display according to an exemplary embodiment of the present invention will be described with reference to FIG. 13. FIG. 13 is a layout view illustrating an electrode of a liquid crystal display according to an exemplary embodiment of the present invention.

Referring to FIG. 13, the electrode of the liquid crystal display according to the present exemplary embodiment is similar to that illustrated in FIG. 11.

An electrode 199 of the pixel electrode of the liquid crystal display according to the present exemplary embodiment includes a third vertical portion 192b and a third horizontal portion 193b that are connected to each other and cross at the center thereof to form a cross-shaped stem portion, and a plurality of fifth branch electrodes 194c that extends obliquely from the third vertical portion 192b and the third horizontal portion 193b. The plurality of fifth branch electrodes 194c extend in four different directions based on the third vertical portion 192b and the third horizontal portion 193b that form the cross-shaped stem portion.

A seventh inverse oblique portion 196e is formed between the third horizontal portion 193b and the fifth branch electrode 194c. The seventh inverse oblique portion 196e extends in a direction opposite to a direction in which the fifth branch electrode 194c extends, based on the left direction and the right direction, in other words, the direction in which the third horizontal portion 193b extends.

Further, an eighth inverse oblique portion 196f is formed between the third vertical portion 192b and the fifth branch electrode 194c. The eighth inverse oblique portion 196f extends in a direction opposite to a direction in which the fifth branch electrode 194c extends, based on the vertical direction, in other words, the direction in which the fifth branch electrode 194c extends.

The electrode 199 of the pixel electrode of the liquid crystal display according to the present exemplary embodiment includes a third edge portion 197c surrounding the plurality of fifth branch electrodes 194c that extend obliquely from the third vertical portion 192b and the third horizontal portion 193b. However, the third edge portion 197c may be omitted.

An exemplary embodiment of the present invention can be applied to all types of liquid crystal displays.

An exemplary embodiment of the present invention can prevent transmittance of a liquid crystal display from deteriorating, which can occur around a stem portion, by preventing an irregular behavior of liquid crystal molecules around the stem portion while implementing multiple domains with a pixel electrode having the stem portion and a plurality of branch electrodes that extends from the stem portion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A liquid crystal display, comprising:
a first substrate;
a gate line and a data line disposed on the first substrate;
a pixel electrode disposed on the first substrate and including a stem portion and a plurality of branch electrodes that extends obliquely from the stem portion;
a second substrate facing the first substrate; and
a common electrode disposed on the second substrate,
wherein the pixel electrode further includes a plurality of oblique portions disposed between the plurality of branch electrodes and the stem portion,
the stem portion includes a first horizontal portion extending in a direction parallel to the gate line,
the plurality of branch electrodes extend in an upper or lower direction from the first horizontal portion,
the plurality of oblique portions are disposed between the first horizontal portion and the plurality of branch electrodes,
the plurality of oblique portions extends in a direction different from a direction in which the plurality of branch electrodes extends, and
a first axis along where the plurality of oblique portions meets the plurality of branch electrodes is parallel to the first horizontal portion.
2. The liquid crystal display of claim 1, wherein:
the stem portion includes a first vertical portion disposed at an edge of a pixel area, and
the first horizontal portion connected with the first vertical portion,
the plurality of branch electrodes includes a first branch electrode that extends in an upper right or upper left direction from the first horizontal portion, and
a second branch electrode that extends in a lower right or lower left direction from the first horizontal portion, and
the plurality of oblique portions includes a first oblique portion disposed between the first horizontal portion and the first branch electrode, and
a second oblique portion disposed between the first horizontal portion and the second branch electrode.

3. The liquid crystal display of claim 2, wherein:
the first oblique portion extends in a direction different from a direction in which the first branch electrode extends, and
the second oblique portion extends in a direction different from a direction in which the second branch electrode extends.

4. The liquid crystal display of claim 3, wherein:
the pixel electrode further includes a first edge portion disposed along the first branch electrode and the second branch electrode and connected with the first vertical portion and the first horizontal portion.

5. The liquid crystal display of claim 2, wherein:
the plurality of oblique portions includes a third oblique portion disposed between the first vertical portion and the first branch electrode, and
a fourth oblique portion disposed between the first vertical portion and the second branch electrode.

6. The liquid crystal display of claim 5, wherein:
the third oblique portion extends in a direction different from the direction in which the first branch electrode extends, and
the fourth oblique portion extends in a direction different from the direction in which the second branch electrode extends.

7. The liquid crystal display of claim 6, wherein:
the pixel electrode further includes a first edge portion disposed along the first branch electrode and the second branch electrode and connected with the first vertical portion and the first horizontal portion.

8. The liquid crystal display of claim 1, wherein:
the stem portion includes a first vertical portion disposed at the edge of the pixel area, and
the first horizontal portion connected with the first vertical portion,
the plurality of branch electrodes includes a first branch electrode that extends in an upper right or upper left direction from the first horizontal portion, and
a second branch electrode that extends in a lower right or lower left direction from the first horizontal portion, and
the inverse oblique portion includes a third inverse oblique portion formed between the first horizontal portion and the first branch electrode, and
a fourth inverse oblique portion formed between the first vertical portion and the second branch electrode.

9. The liquid crystal display of claim 8, wherein:
the third inverse oblique portion extends in a direction opposite to the direction in which the first branch electrode extends based on a direction in which the first vertical portion extends, and
the fourth inverse oblique portion extends in the direction opposite to the direction in which the second branch electrode extends based on the direction in which the first vertical portion extends.

10. The liquid crystal display of claim 9, wherein:
the pixel electrode further includes a first edge portion formed along the first branch electrode and the second branch electrode and connected with the first vertical portion and the first horizontal portion.

11. The liquid crystal display of claim 1, wherein:
the stem portion includes a first vertical portion crossing with the first horizontal portion at the center of a pixel area to have a cross shape,
the plurality of branch electrodes includes a first branch electrode that extends obliquely from the first horizontal portion, and
the plurality of oblique portions includes a first oblique portion disposed between the first horizontal portion and the first branch electrode.

12. The liquid crystal display of claim 11, wherein:
the first oblique portion extends in a direction different from a direction in which the first branch electrode extends.

13. The liquid crystal display of claim 12, wherein:
the pixel electrode further includes a first edge portion disposed along an edge of the first branch electrode and connected with the first vertical portion and the first horizontal portion.

14. The liquid crystal display of claim 1, wherein:
the stem portion includes a first vertical portion crossing with the first horizontal portion at the center of a pixel area to have a cross shape,
the plurality of branch electrodes includes a first branch electrode that extends obliquely from the first vertical portion, and
the plurality of oblique portions includes a first oblique portion disposed between the first vertical portion and the first branch electrode.

15. The liquid crystal display of claim 14, wherein:
the first oblique portion extends in a direction different from the direction in which the first branch electrode extends.

16. The liquid crystal display of claim 15, wherein:
the pixel electrode further includes a first edge portion disposed along an edge of the first branch electrode and connected with the first vertical portion and the first horizontal portion.

17. The liquid crystal display of claim 1, wherein:
the stem portion includes a first vertical portion crossing with the first horizontal portion at the center of a pixel area to have a cross shape and form first, second, third and fourth regions,
the plurality of branch electrodes includes first, second, third and fourth branch electrodes that extend obliquely from the first vertical portion and the first horizontal portion in the first, second, third and fourth regions, respectively, and
the plurality of oblique portions includes first, second, third and fourth oblique portions respectively connected to the first, second, third and fourth branch electrodes, wherein the first, second, third and fourth oblique portions are connected to the first horizontal portion or the first vertical portion.

18. The liquid crystal display of claim 17, wherein:
the first, second, third and fourth oblique portions extend in a direction different from a direction in which the first, second, third and fourth branch electrodes extend, respectively.

19. The liquid crystal display of claim 18, wherein:
the pixel electrode further includes a first edge portion disposed along an edge of the first, second, third and fourth branch electrodes and connected with the first vertical portion and the first horizontal portion.

20. The liquid crystal display of claim 1, wherein a first angle which is an acute angle between the first horizontal portion and the branch electrode is equal to or more than a second angle which is an acute angle between the first horizontal portion and the oblique portion,
wherein the second angle is at one edge of the oblique portion and an opposite edge of the oblique portion has a third angle which is an obtuse angle with the first horizontal portion.

* * * * *